C. B. MOSSI.
DUSTLESS ASH CART AND CAN.
APPLICATION FILED JULY 24, 1915.
1,188,473.
Patented June 27, 1916.
2 SHEETS—SHEET 1.
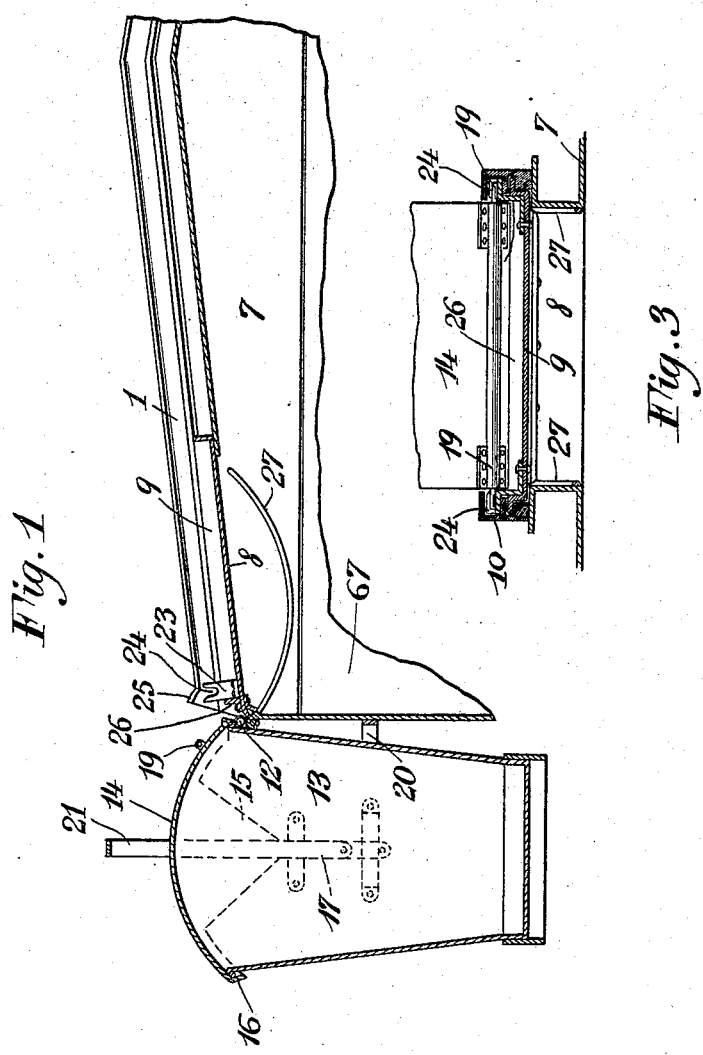
Charles B. Mossi, Inventor
By his Attorneys
Mastick & Lucke

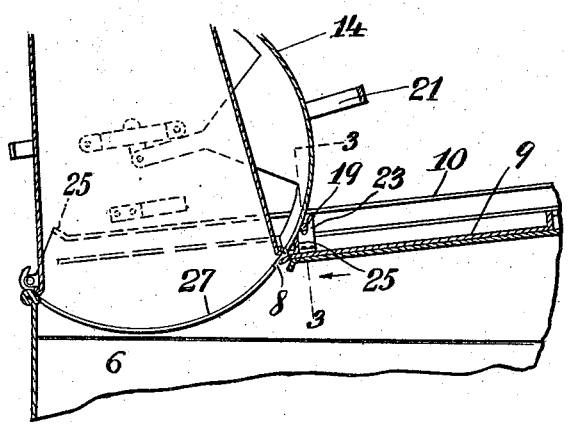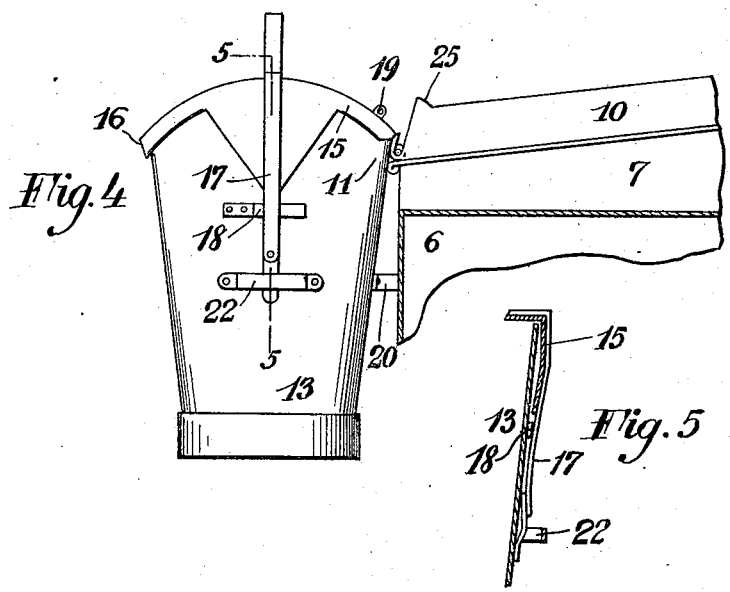

UNITED STATES PATENT OFFICE.

CHARLES B. MOSSI, OF NEW YORK, N. Y., ASSIGNOR OF TWENTY-FIVE AND FIVE-SIXTHS ONE-HUNDREDTHS TO HARRY BARTH, TWENTY-FIVE AND FIVE-SIXTHS ONE-HUNDREDTHS TO HERMAN BAUMAN, THIRTY-THREE AND ONE-THIRD ONE-HUNDREDTHS TO HUGO KASTOR, FIVE ONE-HUNDREDTHS TO ALEXANDER C. SCHROEDER, AND TWO AND ONE-HALF ONE-HUNDREDTHS TO WILLIAM TRAUB, ALL OF NEW YORK, N. Y.

DUSTLESS ASH CART AND CAN.

1,188,473.  Specification of Letters Patent.  Patented June 27, 1916.

Application filed July 24, 1915. Serial No. 41,804.

*To all whom it may concern:*

Be it known that I, CHARLES B. MOSSI, a citizen of the United States, and resident of borough of Brooklyn, county of Kings, city and State of New York, have invented certain new and useful Improvements in Dustless Ash Carts and Cans, of which the following is a description.

My invention relates to dustless ash carts and cans.

An object thereof is to provide a simple, convenient, strong and inexpensive contrivance which will automatically bring into register the top of the can and the opening in the cart by uncovering the cart and can during the up-turning movement of the can to deliver the contents into the cart, and which will restore the covers to their original positions when the can is turned to its normal position.

A further object of the invention is to provide a dustless ash can no part of which can be lost or mislaid during the manipulation of the can.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a transverse vertical section through an ash cart and can embodying my invention; Fig. 2 is a similar section showing the can in the up-turned position; Fig. 3 is a section on line 3—3, Fig. 2, the cover of the can being shown in full; Fig. 4 is a side elevation of the can and overstructure of the cart for the trap; and Fig. 5 is a section on line 5—5, Fig. 4.

Referring to the drawings, 6 represents an ash cart provided with a top 7 sloping from the longitudinal axis toward the sides of the cart. Said top has, preferably, a number of openings 8 adjacent each side thereof, of which only one opening is shown. Covering each opening 8 is a trap 9 slidably mounted in facing guides 10 secured to the top 7. Due to the incline of the guides, trap 9 normally tends to close the openings 8 in the top 7. Each of the guides 10 at the side of the cart is provided with an ear 11 forming a bearing for a lug 12 of an ash can 13.

The ash can has a square top, two edges of which are arcuated, and in the center of which arc a cover 14 is mounted to swing. The cover, which is a cylindrical section, has side flanges 15 overhanging the arcuated edges of the can, and a rear flange 16, which forms a stop for the cover. The arms 17, which connect the cover to the can, engage resilient members 18 secured to the side of the can when said cover closes the top of the can. The frictional engagement between the arms and said resilient members locks the cover to the can when in closed position.

The side lugs 12 are secured to the can 13 adjacent the straight edge of the can, which registers with the front edge of the cover when the cover closes the can. The cover 14 is also provided with side lugs 19 disposed parallelly to the lugs 12 and adjacent the front edge of the cover. When the ash can is to be discharged of its contents, the lugs 12 of the can are made to engage the ears 11 of the guides; thus, the can may be said to be suspended thereat, the lugs 12 carrying the can and contents. A projection 20 is provided at the front of the can to facilitate the engagement of the lugs 12 with the ears 11, as best seen in Figs. 1 and 4. This projection may be used as a handle for the can in manipulating the same. The arms 17 terminate in a handle 21 for manipulating the cover; and additional side handles 22 are provided for the can. By forcing the bottom of the can 13 away from the side of the cart 6, the same will revolve on its lugs 12, with the top of the can closed, until the lugs 19 of the cover are brought into engagement with brackets 23 provided at the front edge of the trap 9. The lugs 19 are guided into slots 24 of the bracket by an arcuated portion 25 provided on the guides 10, best seen in Fig. 1.

The engagement of the lugs 19 with the brackets 23 will cause the cover of the can to swing on its center, the weight of the contents and of the can maintaining the engagement between the lugs 12 and the ears 11; but as the axis of rotation of the cover engaging the trap moves toward the center of the ash cart, it will force the trap 9 to slide toward the center, thus, the trap 9 and the cover 14 will both uncover gradually the opening 8 and the top of the can respectively, with the front edge of the cover continuously in contact with the top of the trap 9 adjacent its front edge. An angular member 26 is provided on the top of the trap, at the front edge, to prevent any liquid matter that may be in the can from passing between the cover and the trap. The top may be provided with side extensions adjacent the openings 8, whereat arcuated members 27 may be provided to form additional supports for the can when the same is completely upturned, that is, when the entire opening 8 is uncovered and also the top of the can. It is self-evident that these arcuated members 27 have the same radius of curvature as the edges of the can, and limit the movement of the top of the can into the cart.

Although the can described is mainly intended to be used with an ash cart it is self-evident that the same can be used as an ordinary ash can, being provided with a swinging arcuated top permanently connected to the can, which cannot be mislaid. The cover is maintained in closed engagement by the frictional engagement of the arms 17 with the resilient members 18, as previously described. It will be noted that by emptying the can into the cart, the cover of the can and the trap of the cart are simultaneously operated, opening gradually while the can is gradually emptied; and due to the contact between the trap and the cover during the turning movement of the can no portion of the opening 8 remains uncovered, thus making the cart and can dust-proof, the width of the openings 8 being equal to the width between the edges at the top of the can, as best seen in Fig. 3.

From the foregoing description, taken in connection with the accompanying drawings, the advantage of the construction and operation of the device shown will be readily understood by those skilled in the art to which the invention pertains, and while I have described the principle of operation, together with the device which I now consider to be the best embodiment thereof, I desire to have it understood that the device shown is merely illustrative and that such changes may be made as are within the scope of the appended claims.

Having thus described my invention, I claim as new and desire to secure by Letters Patent:—

1. In combination,—an ash cart having an opening; a trap normally covering the opening; guides for the trap whereby the same is mounted to slide; an ash can having a rectangular top, two edges of which top are arcuated; an arcuated cover for said can mounted to swing in the axis of curvature of the arcuated edges of the can; means for maintaining the cover over the can top; a lug at each side of the can at the front, adjacent the top, said guides having ears adapted to receive said lugs and forming bearings therefor, whereby said can can be turned over the cart; a lug projecting from each side of the cover adjacent the front end thereof; and brackets on the trap adapted to be engaged by said cover lugs when said can is turned in the ears, said guides for the trap having means for guiding said cover lugs into engagement with the brackets.

2. In combination,—an ash cart having an opening; a trap covering the opening; an ash can; an arcuated cover for the ash can mounted to swing in the axis of curvature of said cover, said can having side lugs at the top adjacent the front thereof, said cart having bearings for said lugs; lugs on said cover adjacent the front edge thereof; brackets on said trap adapted to be engaged by the lugs of the cover when said can is turned in the bearings of the cart, whereby said can cover and trap are simultaneously operated substantially as and for the purpose set forth.

3. In combination,—an ash cart having an opening; a slide trap normally closing the opening; an ash can; a swinging cover therefor normally closing the can, said cart having a support for said can wherefrom said can can be suspended and turned about as an axis; and means bringing said cover and trap into engagement when said can is turned on the support, said means causing the simultaneous operation of said cover and trap when said can is turned, whereby said cover and trap will simultaneously uncover or close the can and cart opening respectively.

4. In combination,—an ash cart having an opening; an ash can having a rectangular top adapted to fit into said opening, said top of can having two arcuated edges; an arcuated cover mounted to swing in the axes of said arcuated edges; an arcuated support associated with the cart and adapted to be engaged by the arcuated edges of the can when said can is moved into the cart opening; a trap for the cart opening normally closing the same; and means for suspending the can on the cart at the opening whereby the top of the can can be swung into the opening of the cart, said cover and trap having co-acting means adapted to simultaneously open the can top and cart opening when the can is swung with its top into engagement with the cart opening, or close the top of the can and the cart opening when the top of the can is swung out of engagement with the cart opening.

5. In combination,—an ash cart having an opening; a slide trap normally closing the opening; an ash can; a swinging cover therefor normally closing the can, said cart having a support for said can wherefrom said can can be suspended and turned about as an axis; and means including lugs extending laterally of said can cover for bringing said cover and trap into engagement when said can is turned on the support, said means causing the simultaneous operation of said cover and trap when said can is turned, whereby said cover and trap will simultaneously uncover or close the can and cart opening respectively.

6. In combination,—an ash cart having an opening; a slide trap normally closing the opening; an ash can; a swinging cover therefor normally closing the can, said cart having a support for said can wherefrom said can can be suspended and turned about as an axis; and means including lugs extending laterally and exteriorly of said can cover for bringing said cover and trap into engagement when said can is turned on the support, said means causing the simultaneous operation of said cover and trap when said can is turned, whereby said cover and trap will simultaneously uncover or close the can and cart opening respectively.

7. In combination,—an ash cart having an opening; a slide trap normally closing the opening; an ash can; a swinging cover therefor normally closing the can, said cart having a support for said can wherefrom said can can be suspended and turned about as an axis; and means including lugs extending laterally of said can cover and guides therefor fixed to said cart for bringing said cover and trap into engagement when said can is turned on the support, said means causing the simultaneous operation of said cover and trap when said can is turned, whereby said cover and trap will simultaneously uncover or close the can and cart opening respectively.

In testimony whereof I have signed this specification.

C. B. MOSSI.